United States Patent [19]
Smith et al.

[11] 3,985,442
[45] Oct. 12, 1976

[54] DATA ACQUISITION SYSTEM FOR SPECTROPHOTOMETER

[75] Inventors: Charles W. Smith, Ulster; Mahlon D. Dyer, Sugar Run, both of Pa.

[73] Assignee: GTE Sylvania Incorporated, Stamford, Conn.

[22] Filed: June 7, 1974

[21] Appl. No.: 477,258

[52] U.S. Cl. .................................. 356/96; 356/97; 356/100
[51] Int. Cl.² .......................................... G01J 3/42
[58] Field of Search .................. 356/96, 97, 98, 100

[56] References Cited
UNITED STATES PATENTS

| | | | |
|---|---|---|---|
| 3,486,822 | 12/1969 | Harris | 356/83 |
| 3,563,656 | 2/1971 | Helms | 356/96 |
| 3,695,764 | 10/1972 | Delmas et al. | 356/97 |
| 3,704,953 | 12/1972 | Carter et al. | 356/96 |
| 3,728,540 | 4/1973 | Todd et al. | 356/51 |
| 3,794,425 | 2/1974 | Smith et al. | 356/96 |
| 3,868,499 | 2/1975 | Aaronson et al. | 356/98 |

*Primary Examiner*—Vincent P. McGraw
*Attorney, Agent, or Firm*—Norman J. O'Malley; Lawrence R. Fraley; Donald R. Castle

[57] ABSTRACT

A data acquisition system for a spectrophotometer which comprises a pulse providing means for sequentially providing an established number of pulses to the stepping drive means of the spectrophotometer for sequentially moving the spectrophotometer's monochromator means to a plurality of test positions. The pulse providing means further provides output signals indicative of each of the test positions. The system also comprises an output means connected to said pulse providing means for providing sequential output signals representative of the spectrophotometer output signals at each test position.

12 Claims, 3 Drawing Figures

DATA ACQUISITION SYSTEM FOR SPECTROPHOTOMETER

BACKGROUND OF THE INVENTION

This invention relates to spectral analysis apparatus and more particular to a system for use with spectral analysis apparatus which utilize a spectrophotometer. Even more particularly, this invention relates to a data acquisition system which can be used with spectrophotometers.

A commonly known device for use in the spectral analysis of materials is the spectrophotometer. This device is particularly useful in the analysis of luminescent materials such as phosphors for lamps and television cathode ray tubes. In this particular usage, however, it is commonly desired to further evaluate the output of the spectrophotometer to provide a more detailed, comparative analysis of the sampled material. Today's spectrophotometer systems are deficient in this respect in that they fail to provide an automated, efficient means for collecting the data output from the spectrophotometer for eventual further analysis.

A previously used method for acquiring data from a conventional spectrophotometer has been to utilize a conventional graph recorder in conjunction with the spectrophotometer. The response of the particular phosphor was in turn recorded on the graph paper at established intervals, e.g. 100 angstroms. To achieve this, it was necessary to synchronize the scanning speed of the spectrophotometer to the chart output speed of the recording unit. The values obtained from the graph were then transferred by hand to data sheets which in turn were used to punch data cards. Accordingly, these cards were utilized to provide the analysis of the phosphor. As can be appreciated, such a method required a substantial time period of manual operation which in turn increased the opportunity for error in both the operation of the equipment and the eventual analysis of the resulting data.

Accordingly, it is believed that a data acquisition system for a spectrophotometer which is substantially more automated and less subject to human error when compared to prior known acquisition methods would constitute an advancement in the art.

OBJECTS AND SUMMARY OF THE INVENTION

It is, therefore, a primary object of this invention to provide a data acquisition system for a spectrophotometer which is substantially more automated than known existing methods.

It is a further object of this invention to provide a spectrophotometer data acquisition system which substantially reduces the difficulty and time involved in known systems as well as reduces the opportunity for human error.

In accordance with a primary aspect of this invention there is provided a data acquisition system for a spectrophotometer. The system comprises a dual functioning pulse providing means and an output means. The pulse providing means sequentially provides an established number of pulses to the spectrometer's drive means for sequentially moving the monochromator means of the spectrophotometer to a plurality of test positions. The pulse providing means also provides a series of output signals indicative of the described test positions. The output means of the invention is connected to the pulse providing means and the spectrophotometer for providing output signals indicative of the spectrophotometer's output signals at each of the test positions.

DETAILED DESCRIPTION OF THE PREFERRED EMBODIMENT

For a better understanding of the present invention, together with other and further objects, advantages and capabilities thereof, reference is made to the following disclosure and appended claims in connection with the above-described drawings.

Figure 1:
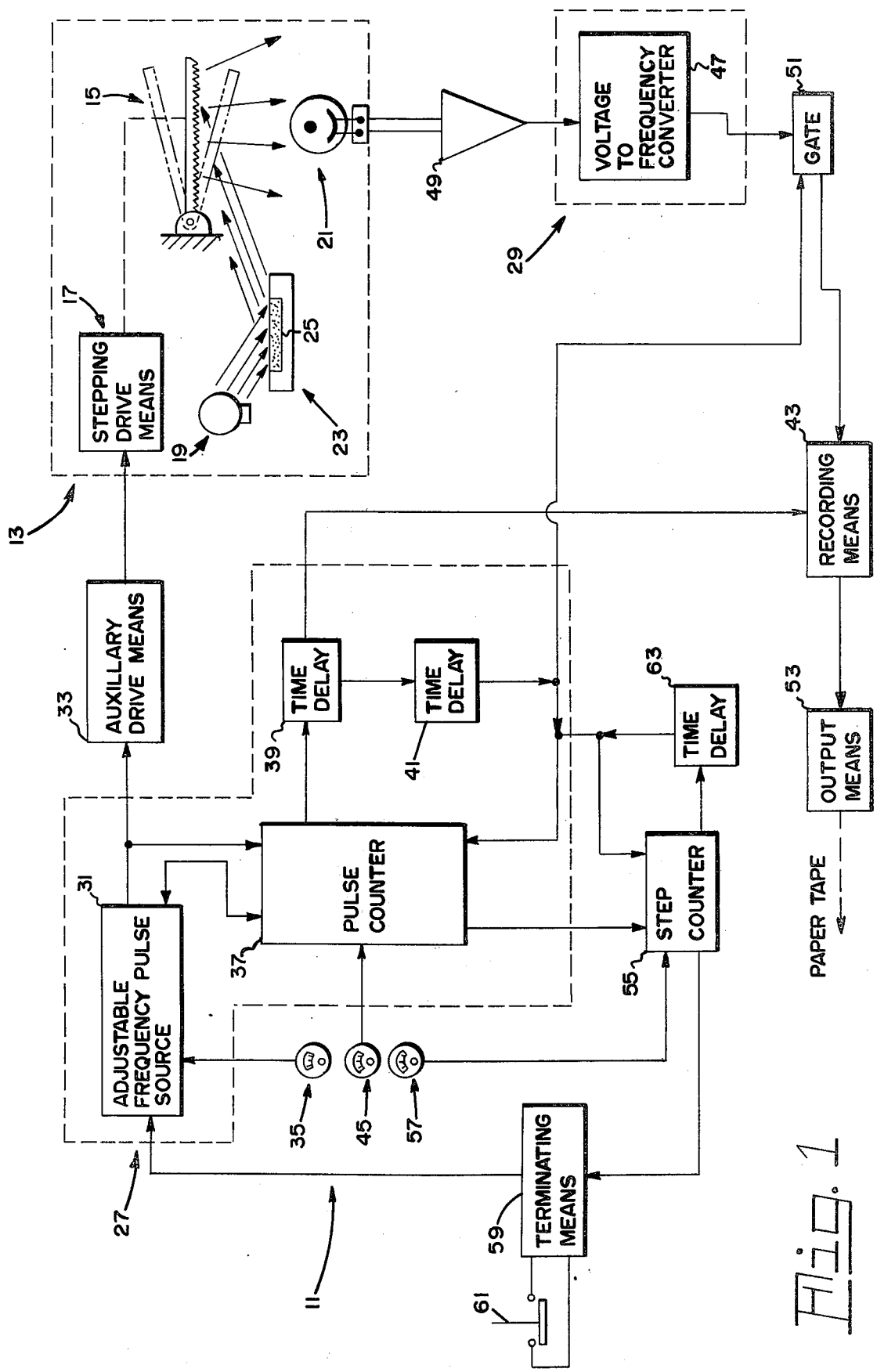
FIG. 1 is a schematic view of a preferred embodiment of the present invention operatively joined to a conventional spectrophotometer.

With particular reference to FIG. 1, there is illustrated a data acquisition system 11 for a spectrophotometer 13 in accordance with a preferred embodiment of the present invention. Spectrophotometer 13, typical of most standard spectrophotometers, includes a monochromator means, illustrated as diffraction grating 15 and a stepping drive means 17. As is also typically found in most spectrophotometers, a light source 19 and a photosensitive detection means 21 are provided. In operation, light source 19 provides light to a sample holder 23 in which is positioned the sample 25. As is standard in the operation of most spectrophotometers, the light provided by light source 19 is reflected off the sample being measured to the diffraction grating 15. The diffraction grating in turn serves to separate the light transmitted thereto into varying wavelengths. Stepping drive means 17 mechanically drives diffraction means 15 to subject the photosensitive detection means 21 to each of the varying wavelengths, or test positions. When analyzing phosphor samples it is preferred that light source 19 provide light of ultraviolet wavelengths to sample 25. It is to be understood however that the present invention is not limited to this particular application in that other wavelengths e.g. infra-red, can also be utilized. Furthermore, although the monochromator means of spectrophotometer 13 is illustrated as a diffraction grating, it is also understood that a drivable prism or prisms assembly could also successfully be utilized with only a minor amount of adjustments to the spectrophotometer 13. Stepping means 17 is typical of most of the drive means found in spectrophotometers and further description is not believed necessary. It is preferred that a photomultiplier tube be used for the photosensitive detection means 21 although this is also not meant to be limited to the present invention in that any photosensitive output which is capable of detecting radiant energy and converting this energy to electrical energy can be utilized.

The data acquisition system 11 in accordance with a preferred embodiment of the present invention comprises a pulse providing means 27 for sequentially providing a predetermined number of pulses to the stepping drive means 17 of spectrophotometer 13 for sequentially moving diffraction grating 15 to a plurality of test positions. Pulse providing means 27 is further adapted for providing output signals indicative of each said test positions as will be explained in the following description. Data acquisition system 11 also comprises an output means 29 which is connected to pulse providing means 27 and to spectrophotometer 13 for providing sequential output signals indicative of the spectrophotometer's output signals at each of the described test positions.

In the present invention, it is preferred that pulse providing means 27 comprise an adjustable frequency pulse source 31 powered to an external power source (not shown). Adjustable frequency pulse source 31 is in turn electronically connected to an auxiliary stepping drive means 33 which in turn provides the drive command to the spectrophotometer's drive means 17. A suitable frequency pulse source which can be successfully utilized with the present invention is the model No. 4701 voltage/frequency converter, available from Teledyne Philbrick, Dedham, Mass. The spectrophotometer for use in the present invention is available under model No. 1702 from Spex Industries, Metuchan, N.J. Similarly, auxiliary drive means 33 is also available from Spex Industries under model No. 17513 described as a stepper motor control. It is to be understood, however, that with regard to the present invention the described auxiliary drive means is utilized as an added component and is not meant to restrict the scope of the present invention. In short, adjustable frequency pulse source 31 could serve to directly drive the spectrophotometer's drive means 17.

As stated, it is preferred that pulse source 31 be adjustable. Accordingly adjustment means 35 is provided so that the operator of the system can readily establish the speed of operation. More specifically, the operator is thus readily able to establish the preferred number of steps per second of readings taken by the spectrophotometer. In the present invention the preferred speed range is about 1,000 per second.

In the present invention, pulse providing means 27 further comprises a pulse counter means 37 operatively connected to pulse source 31. Pulse counter 37 counts the number of pulses provided by pulse source 31 to auxiliary drive means 33 and is further adapted for temporarily disengaging pulse source 31 upon counting a predetermined number of pulses. A more detailed description of the operation of pulse counter 37 will be given with the description of FIG. 2. As stated, upon counting a predetermined number of pulses, pulse counter 37 temporarily disengages pulse source 31. At the same time pulse counter 37 provides a signal to a first delay means 39 also included within pulse providing means 27. First delay means 39 as illustrated is operatively connected to pulse counter 37 and upon activation by the pulse counter provides a time-delayed signal both to a second delay means 41 and a recording means 43 (to be described). As illustrated both of the aforedescribed time-delay means are incorporated within pulse providing means 27. Suitable components for use as the described delay means are model No. 555 timers, available from the Signetics Corporation, Sunyvale, Calif. Upon receiving the described time-delay signal from first delay means 39, second delay means 41 in turn is operatively connected to pulse counter 37 and provides a time-delayed signal to the pulse counter to clear the pulse counter upon receiving said signal. As can be understood, this serves to reset the pulse counter from the predescribed number detected for the pulses supplied the auxiliary drive means back to zero. Upon receiving said delayed signal, the pulse counter is once again ready to count pulses transmitted by pulse source 31 and accordingly triggers the pulse source to do so. Accordingly, it can be seen that during the aforedescribed sequence, the diffraction grating 15 of spectrophotometer 13 has been temporarily positioned at a predetermined reading to provide the photosensitive detection means 21 with a particular wavelength. As has been further explained, acquisition system 11 is now capable of actuating drive means 17 of the spectrophotometer to move diffraction grating 15 to the next desired test position.

It is preferred in the present invention that like pulse source 31, pulse counter 37 also be adjustable. Accordingly adjustment means 45 is provided in order that the operator of the system can establish the number of angstroms per step of the test positions taken by spectrophotometer 13.

In the preferred embodiment of the present invention, output means 29 comprises a voltage to frequency converter 47 which in turn is operatively connected to the photosensitive detection means 21 of spectrophotometer 13 through an amplification means, illustrated as amplifier 49. Converter 47, similar to pulse source 31, is available under model No. 4701 from the aforementioned Teledyne Philbrick Corporation. The output signal transmitted by converter 47 is preferrably supplied to a gating means 51 operatively connected to converter 47 and adapted for providing an output signal upon receiving said signal from the converter. As explained, the sequential operation of the spectrophotometer 13 by pulse providing means 27 in turn results in a sequential output signal from the spectrophotometer to output means 29. The operation of the described gating means 51 and amplification means 49 are well known in the art and further description is therefore not believed necessary. As illustrated in FIG. 1, gating means 51 is also operably connected to second delay means 41. Accordingly, when second delay means 41 provides the described time-delayed signal to pulse counter 37, it also serves to trigger gate 51. Upon doing so, gate 51 now transmits an output signal to recording means 43. Recording means 43 will in turn begin recording the output signal from gating means 51 provided time-delay 39 provides the described time-delayed signal. In the present invention, recording means 43 is a Series 2200 System Analyzer, available from Nuclear Data Incorporated, Palatine, Ill. It should be understood however that several types of recording means can be readily utilized in this particular application and the aforedescribed system analyzer is not meant to restrict the present invention in any manner. Recording means 43 is adapted for recording the signal from gating means 51 and for further providing a signal representative of said recording to an output means 53. Output means 53 consists of any unit capable of providing a visual output upon being actuated by an established signal. In the present invention a preferred component for output means 53 is a teletype unit, model No. 33-1c, and available from Teletype Corporation, Skokie, Ill. Accordingly, the described teletype provides a visual output in the form of a paper tape to the operator of the system when triggered by recording means 43. Although other visual outputs may be satisfactorily employed with the present invention, e.g. a standard process computer with a digital input section, the described output is preferred in that it can directly be fed to a standard computer for subsequent analysis if desired. Thus, it can be seen that the present invention has eliminated many of the previously described procedures required in known prior art methods, particularly graph and data sheet preparation as well as preparation of punched data cards.

As can further be seen in FIG. 1, data acquisition system 11 further comprises a step counter means 55 which is operatively connected to pulse counter means 37. Step counter 55 provides the function of counting the number of times that pulse counter 37 temporarily disengages the adjustable frequency pulse source 31. In the preferred embodiment of the invention, step counter 55 comprises a plurality of flip-flop circuits available from the Motorola Corporation, Phoenix, Ariz. under part number MC790P. These circuits operate in conjunction with a MC789P inverter, also available from Motorola Corporation. It should be understood however that several marketable counters are available and could be successfully utilized with the present invention. Similarly to pulse source 31 and pulse counter 37, it is preferred that step counter 55 be adjustable. Accordingly, an adjustment means 57 is provided whereby the operator can establish a desired number of times that pulse counter 37 will temporarily disengage pulse source 31.

Operatively connected to step counter 55 is a terminating means 59 which serves to permanently disengage pulse source 31 when step counter 55 has counted a predetermined number of disengagements by pulse counter 37 as established by the systems operator. A further description of the terminating means 59 will be provided with the description of FIG. 3. Electronically connected to terminating means 59 is a reset means illustrated as a reset switch 61. Accordingly, reset means 61 provide the means whereby the operator of the system may reset the system once pulse source 31 has been permanently disengaged.

Also operatively connected to step counter 55 is an auxiliary delay means 63 which is adapted for providing a time-delayed signal to the step counter means in order to clear the step counter after the counter has counted a predetermined number of disengagements by pulse counter 37. In short, auxiliary delay means 63 serves to reset the counter mechanism from the number as established by the operator using adjustment means 57 back to zero. Similar to time-delays 39 and 41, time-delay 63 is a model No. 555 timer, available from the Signetics Corporation, Sunnyvale, Calif.

Figure 2:
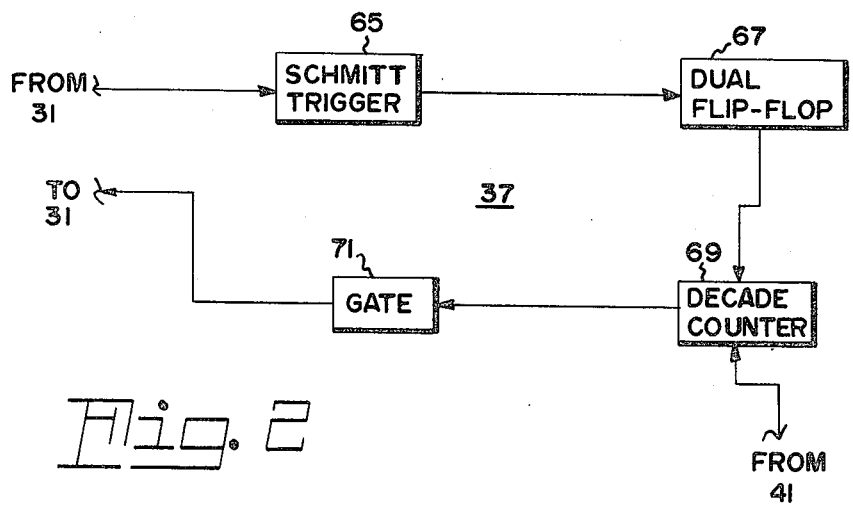
FIG. 2 is a schematic view of the preferred pulse counter means of the present invention.

With particular reference to FIG. 2, a more detailed explanation of pulse counter means 37 is provided. As described in FIG. 1, when pulse source 31 provides a predetermined number of pulses to auxiliary drive means 33, pulse counter 37 counts these pulses and upon reaching a pre-established number, serves to temporarily disengage pulse source 31. More particularly as indicated in FIG. 2, the pulse count is first provided to a standard Schmitt trigger circuit 65. The primary function of the Schmitt trigger circuit is to shape the pulses and thereafter transmit them to a dual flip-flop circuit arrangement 67 wherein the signal is scaled. The described Schmitt trigger, a typical circuit well known in the art, is available under model No. SN 7413 from the Texas Instruments Corporation, Dallas, Tex. while the described dual flip-flop circuit is available from the previously mentioned Motorola Corporation under the model No. MC790P. The resulting scaled signal is then transmitted to a decade counter 69 which in turn transmits the signal to a gate means 71. When triggered by decade counter 69, gate means 71 serves to disengage pulse source 31. As further seen in FIG. 2, the necessary connection from the previously described second delay means 41 is also illustrated which in turn provides the necessary signal to clear the counter mechanism 69 of pulse counter 37. In the present invention, counter 69 is a standard decade counter available from the described Motorola Corporation under the model No. MC7490P. The described gating means 71 is similarly available from the Motorola Corporation under the model No. MC724P.

Figure 3:
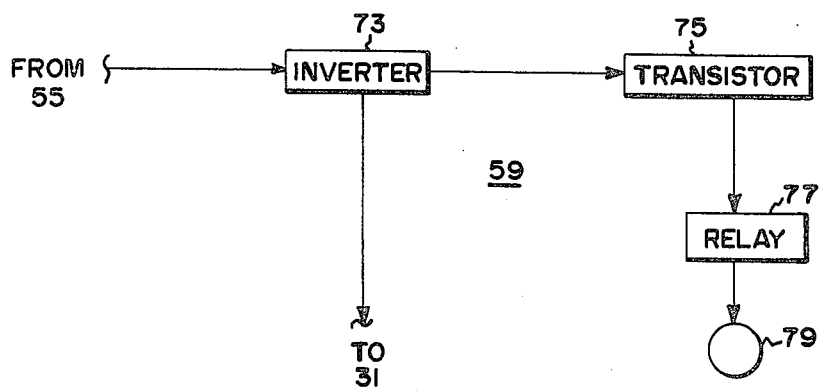
FIG. 3 is a schematic view of the preferred terminating means of the present invention.

With particular reference to FIG. 3, a more detailed explanation of the terminating means 59 as illustrated in FIG. 1 is provided. The pulse from step counter means 55 is first received by an inverter 73 which when properly signaled transmits a signal to both a transistor 75 and to the frequency pulse source 31. The signal to pulse source 31, as described, serves to permanently disengage pulse source 31 from further operation and it is only when the operator actuates the reset means 61 (shown in FIG. 1) connected to inverter 73 that the pulse source will again begin transmitting. The described signal to transmitter 75 is in turn relayed to a relay means 77 and thereafter to a visual indication means, illustrated as light 79. Thus, a means has been shown whereby the operator of system 11 can readily discern when the adjustable frequency pulse source has been permanently disengaged from operation and that the desired sequence of analyzations has occured. The preferred inverter means for inverter 73 is a marketable item available from the described Motorola Corporation under the product number MC789P while the described transistor is an established 2N2207 transistor. Relay 77 and light 79 are both easily attainable components and further description is not considered necessary.

Thus there has been shown and described a data acquisition system for use in conjunction with a spectrophotometer. The system as described is more automated and less subjective to error by the systems operator.

While there have been shown and described what are at present considered the preferred embodiments of the invention, it will be obvious to those skilled in the art that various changes and modifications may be made therein without departing from the scope of the invention as defined by the appended claims.

What is claimed is:

1. A data acquisition system for a spectrophotometer including a monochromator means movable by a stepping drive means, said data acquisition system comprising:

a pulse source connected to said stepping drive means for providing pulses to said stepping drive means at a predetermined rate to move said monochromator means to a plurality of test positions;

a pulse counter means connected to said pulse source for counting said pulses provided by said pulse source to said stepping drive means, for sequentially disengaging said pulse source from said stepping drive means when a predetermined number of pulses representative of each of said test positions has been counted, and for providing a signal indicative of each of said disengagements;

clearing means connected to said pulses counter means for receiving said signal indicative of each of said disengagements and for clearing said pulse counter means in response to said signal;

output means connected to said pulse counter means and to said spectrophotometer for receiving said signal from said pulse counter means and for providing sequential output signals indicative of the spectrophotometer output signals at each of said test positions in response to said signal from said pulse counter means.

2. The data acquisition system according to claim 1 wherein said pulse source comprises an adjustable frequency pulse source.

3. The data acquisition system according to claim 1 wherein said output means comprises a voltage to frequency converter.

4. The data acquisition system according to claim 1 further comprising an auxiliary drive means interconnecting said pulse source and said stepping drive means of said spectrophotometer.

5. The data acquisition system according to claim 1 further comprising amplification means interconnecting said spectrophotometer and said output means.

6. The data acquisition system according to claim 1 wherein said clearing means comprises a delay means operatively connected to said pulse counter means for providing a time-delayed signal to said pulse counter means to clear said pulse counter means upon receiving said signal indicative of each of said disengagements from said pulse counter means.

7. The data acquisition system according to claim 1 further comprising a step counter means operatively connected to said pulse counter means for counting the number of times said pulse counter means disengages said pulse source.

8. The data acquisition system according to claim 7 further comprising a terminating means operatively connected to said step counter means and said pulse source for permanently disengaging said pulse source when said step counter means counts a predetermined number of disengagements by said pulse counter means.

9. The data acquisition system according to claim 7 further comprising an auxiliary delay means operatively connected to said step counter means for providing a time-delayed signal to said step counter means to clear said step counter means after said step counter means counts a predetermined number of disengagements by said pulse counter means.

10. The data acquisition system according to claim 6 further comprising a gating means operatively connected to said output means and said clearing means for receiving said time-delayed signal from said clearing means and for providing an output signal upon receiving said sequential output signals from said output means and said time-delayed signal from said clearing means.

11. The data acquisition system according to claim 10 further comprising a recording means operatively connected to said delay means and said gating means for receiving said time-delayed signal from said delay means, for recording said output signal from said gating means upon receiving said time-delayed signal, and for providing a signal representative of said recording.

12. The data acquisition system according to claim 11 further comprising a visual output means operatively connected to said recording means for providing a visual output upon receiving said representative signal from said recording means.

* * * * *